(12) United States Patent
Schwalie et al.

(10) Patent No.: US 7,360,817 B2
(45) Date of Patent: Apr. 22, 2008

(54) TRUCK BOX WITH REDUCED CLEARANCE COVER AND ACCESS FOR ELECTRICAL CORD PASSTHROUGH

(75) Inventors: Tom Schwalie, Crystal Lake, IL (US); Barry Bidinger, Palatine, IL (US); Jerry Draffkorn, Jr., Woodstock, IL (US); Atul Saigal, Algonquin, IL (US); Randy Hyde, Crystal Lake, IL (US)

(73) Assignee: Knaack LLC, Crystal Lake, IL (US)

( * ) Notice: Subject to any disclaimer, the term of this patent is extended or adjusted under 35 U.S.C. 154(b) by 85 days.

(21) Appl. No.: 10/963,898

(22) Filed: Oct. 13, 2004

(65) Prior Publication Data

US 2006/0076793 A1    Apr. 13, 2006

(51) Int. Cl.
*B60R 7/00*    (2006.01)
(52) U.S. Cl. .................. 296/37.6; 224/404; 174/153 G
(58) Field of Classification Search ............... 296/37.6, 296/146.1, 152; 220/845; 224/403–404; 174/153 G; 206/702; 439/501
See application file for complete search history.

(56) References Cited

U.S. PATENT DOCUMENTS

| | | | |
|---|---|---|---|
| 3,237,824 A | 3/1966 | Gunckel .................. 224/42.42 |
| 3,613,044 A | 10/1971 | Rarick | |
| 3,640,423 A | 2/1972 | Parker et al. ............. 220/31 R |
| D257,340 S | 10/1980 | Grossman ................... D12/157 |
| D261,499 S | 10/1981 | Sauber ....................... D12/157 |
| 4,320,862 A | 3/1982 | Bettenhausen ....... 224/42.03 A |
| D275,275 S | 8/1984 | Stapp ......................... D12/157 |
| 4,488,669 A | 12/1984 | Waters ........................ 224/273 |
| D285,673 S | 9/1986 | Waters ....................... D12/157 |
| 4,635,992 A | 1/1987 | Hamilton et al. .......... 296/37.6 |
| 4,674,665 A | 6/1987 | Van Kirk .................... 224/273 |
| 4,705,317 A | 11/1987 | Henri ......................... 296/37.6 |
| D294,935 S | 3/1988 | Grossman .................. D12/157 |
| 4,770,330 A * | 9/1988 | Bonstead et al. | |
| D298,308 S | 11/1988 | VanKirk ..................... D12/157 |
| 4,848,626 A | 7/1989 | Waters ........................ 224/273 |
| D305,502 S | 1/1990 | Waters ........................ D9/341 |
| D315,540 S | 3/1991 | Carmody ................... D12/157 |
| D317,720 S | 6/1991 | Fielder ........................ D9/425 |

(Continued)

FOREIGN PATENT DOCUMENTS

GB                341309           1/1931

OTHER PUBLICATIONS

Adrian Truck Box.

(Continued)

*Primary Examiner*—Stephen Gordon
(74) *Attorney, Agent, or Firm*—McDonnell Boehnen Hulbert & Berghoff LLP

(57) ABSTRACT

The truck box is provided with a reduced clearance cover and a 90 degree cover opening. The mounting arrangement for the cover is offset from the back wall of the box. Thus, less clearance is required to accommodate the cover of the box in its open 90 degree position. The truck box is also provided with an access for electrical cord passthrough in one of its walls through which an electrical cord can be fed. As a result, power can be safely and easily provided to equipment positioned on the box.

14 Claims, 4 Drawing Sheets

U.S. PATENT DOCUMENTS

| | | | |
|---|---|---|---|
| D317,868 S | 7/1991 | Fielder | D9/425 |
| 5,037,153 A | 8/1991 | Stark | 296/37.6 |
| 5,065,887 A | 11/1991 | Schuh et al. | 220/338 |
| 5,080,250 A | 1/1992 | Dickinson et al. | 220/335 |
| D324,197 S | 2/1992 | Dickinson | D12/157 |
| 5,088,636 A | 2/1992 | Barajas | 224/281 |
| 5,169,200 A | 12/1992 | Pugh | 296/37.6 |
| 5,201,561 A | 4/1993 | Brown | 296/37.5 |
| 5,299,722 A | 4/1994 | Cheney | 224/273 |
| D349,091 S | 7/1994 | Dickinson | D12/406 |
| D349,680 S | 8/1994 | Powell | D12/406 |
| 5,382,069 A | 1/1995 | Chambers | 296/37.6 |
| 5,419,476 A | 5/1995 | White | 224/273 |
| 5,484,092 A | 1/1996 | Cheney | 224/404 |
| D369,140 S | 4/1996 | Sills | D23/423 |
| D369,342 S | 4/1996 | Williams | D12/423 |
| D373,989 S | 9/1996 | Dickonson | D12/423 |
| 5,567,916 A * | 10/1996 | Napiorkowski et al. | |
| 5,597,201 A | 1/1997 | Hinze | 287/188.1 |
| 5,598,961 A | 2/1997 | Sills | 224/404 |
| 5,601,206 A | 2/1997 | Haas et al. | 220/527 |
| 5,680,932 A | 10/1997 | Dickinson et al. | 206/372 |
| 5,848,701 A * | 12/1998 | Riccabona | |
| D403,654 S | 1/1999 | Houry | D12/414.1 |
| 5,924,615 A * | 7/1999 | McGarrah | |
| 5,964,492 A | 10/1999 | Lyon | 296/37.6 |
| 6,007,128 A | 12/1999 | Hines, Jr. | 296/37.6 |
| D419,066 S | 1/2000 | Lentini | D9/423 |
| 6,039,203 A | 3/2000 | McDaniel | 220/562 |
| D426,511 S | 6/2000 | Mehuron | D12/414.1 |
| 6,079,585 A | 6/2000 | Lentini | 220/324 |
| D434,225 S | 11/2000 | Story et al. | D3/281 |
| 6,151,933 A | 11/2000 | Lentini | 70/159 |
| D436,342 S | 1/2001 | Lopez | D12/414.1 |
| 6,331,121 B1 * | 12/2001 | Raeford, Sr. | |
| 6,334,560 B1 | 1/2002 | Lentini | 224/404 |
| 6,386,409 B1 | 5/2002 | Cheney | 224/404 |
| 6,554,169 B1 | 4/2003 | Furlong | 224/404 |
| 6,729,514 B1 | 5/2004 | Delgado | 224/404 |
| 2002/0008044 A1 | 1/2002 | Burrus, IV et al. | 206/373 |
| 2002/0113106 A1 | 8/2002 | Cheney | 224/404 |
| 2003/0102322 A1 | 6/2003 | Jones et al. | 220/836 |

OTHER PUBLICATIONS

Daws Mfg. Truck Box.
Jobox Truck Box.
UWS Truck Box.
Knaack Catalog, 1993, showing Weather Guard Truck Box.
International Search Report for PCT/US2005/036546 mailed Feb. 14, 2006.

* cited by examiner

TRUCK BOX WITH REDUCED CLEARANCE COVER AND ACCESS FOR ELECTRICAL CORD PASSTHROUGH

BACKGROUND OF THE INVENTION

1. Field of the Invention

This invention relates to the field of storage devices for motor vehicles. More particularly, this invention relates to storage devices for pickup trucks.

2. Description of Related Art

Storage devices, more particularly, truck boxes are commonly used with pickup trucks and vary in size, shape, finish, and efficiency. They are typically designed to integrate to the contours and cavities present in pick-up truck beds and are used to store and transport tools, hardware, and equipment used for various projects. Although a number of truck boxes are currently on the market, all of them suffer from common drawbacks.

When mounted, a truck box needs to take up as little space as possible in the bed of a pickup truck while still providing adequate storage space. In the currently available truck boxes, the covers are mounted directly on the back wall of the truck boxes. Thus, when the covers are pivoted to the open position, enough room must be left in the bed of the pickup truck to accommodate the depth of the box as well as the depth of the cover.

Further, in many of the available truck boxes, the covers typically open up to less than a 90 degree opening. Such an opening makes the removal of tools and other equipment cumbersome.

Additionally, some equipment stored in the truck box requires access to an electric supply. For example, battery chargers stored in the truck box must be connected to a power supply in order to charge the batteries used with tools such as drills. In the past, some contractors drilled a hole through the wall of the box in order to allow access to a power supply, which was a time-consuming exercise. Alternatively, cords were run from the equipment over the side wall of the box to a power supply. When the cover of the box was shut, it would pinch the cord between the cover and the top of the side wall. The presence of the cord makes it difficult for the box to be locked properly. Understandably, both prior practices are undesirable for the contractor.

Accordingly, there is a need for a truck box that provides a reduced clearance cover that requires less truck bed space for mounting. Further, there is a need for a truck box with a 90 degree cover opening for easy access to the equipment contained in the box. Lastly, there is a need to provide an access in the truck box to allow for electrical cord passthrough.

SUMMARY OF THE INVENTION

The present invention meets the shortcomings of the prior art by providing a truck box with a reduced clearance cover and a 90 degree cover opening. The mounting arrangement for the cover is offset from the back wall of the box. Thus, less clearance is required to accommodate the cover of the box in its open position. Accordingly, the truck box with such a cover requires less truck bed space for mounting while facilitating access to the tools and supplies contained in the truck box.

Further, the present invention meets the shortcomings of the prior art by providing an access for electrical cord passthrough. Specifically, the truck box is provided with an access in one of the side walls of the truck box through which an electrical cord can be fed. As a result, power can be safely and easily provided to equipment positioned on the box.

DETAILED DESCRIPTION OF THE PREFERRED EMBODIMENTS

Figure 1:
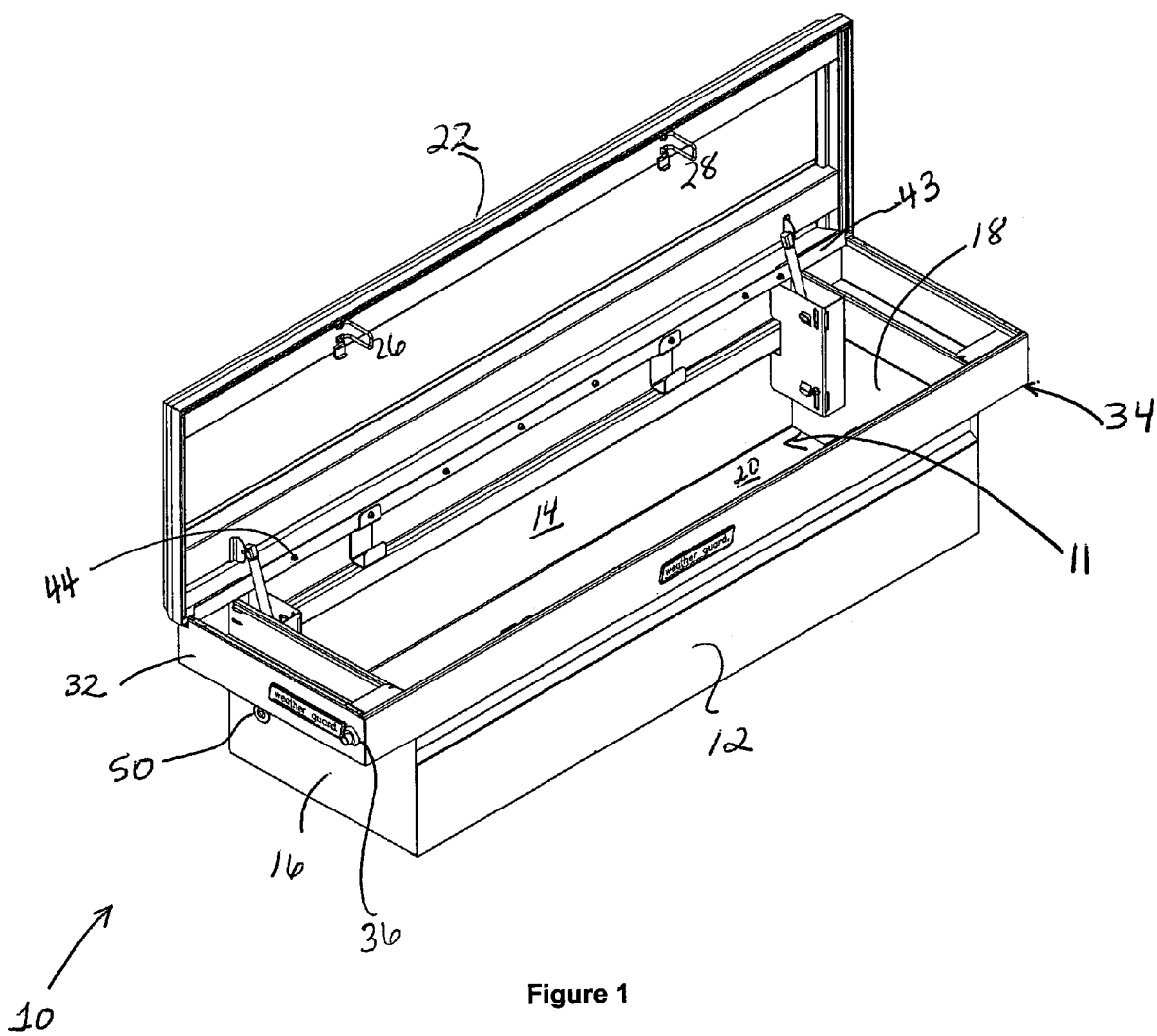
FIG. 1 is a perspective view of the truck box of the present invention.

With reference to FIG. 1, a truck box 10 has a storage compartment 11, a front wall 12, a back wall 14, two side walls 16, 18 extending between the front and back walls, and a bottom wall 20. The box 10 further includes a top cover 22 that is pivotable between an open and a closed position. The cover 22 is provided with a pair of latches 26, 28 that mate with a pair of latching mechanisms (not shown) on the front wall 12 of the box 10 in order to lock the box 10. The cover 22 further includes an interior surface 23. Each side wall 16, 18 has a protruding shelf 32, 34 that extends therefrom and rests upon respective side walls of a pickup truck cargo bed. The shelf 32, 34 includes a ton surface 35. The side walls are each provided with a pushbutton 36 (only one shown) for operating the latching mechanisms.

Figure 2:
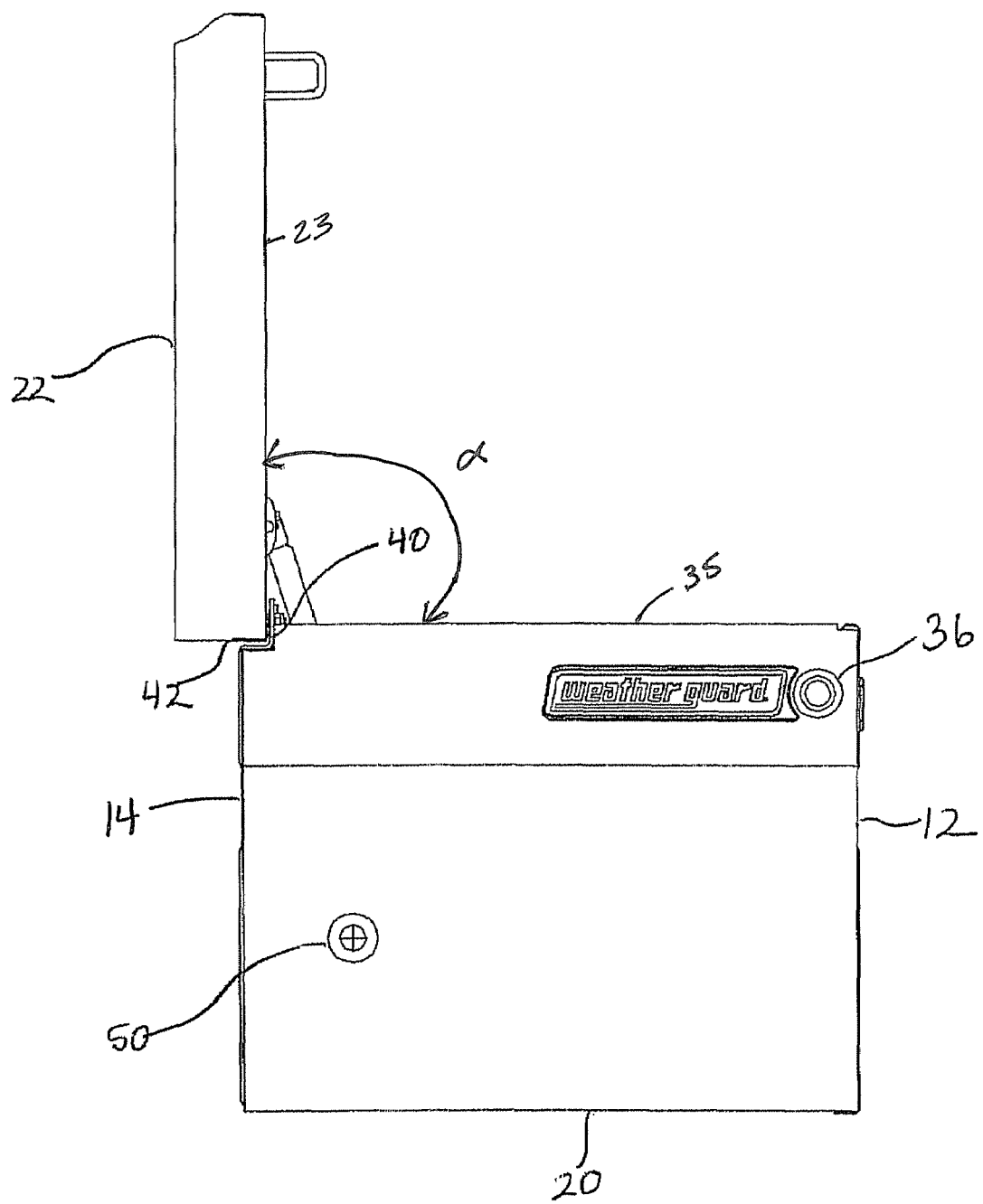
FIG. 2 is a side view of the truck box of FIG. 1.

The top edge of the back wall 14 is provided with an abutment 40, as can be seen in FIG. 2. The purpose of this abutment is to accommodate a portion of the rear wall 42 of the top cover 22 when the cover is in its open position. Since a portion of the cover is accommodated within this abutment 40 in the open position, the cover 22 is recessed and takes up less space in the bed of a pickup truck as compared to currently available truck boxes that have conventionally mounted covers.

Figure 3:
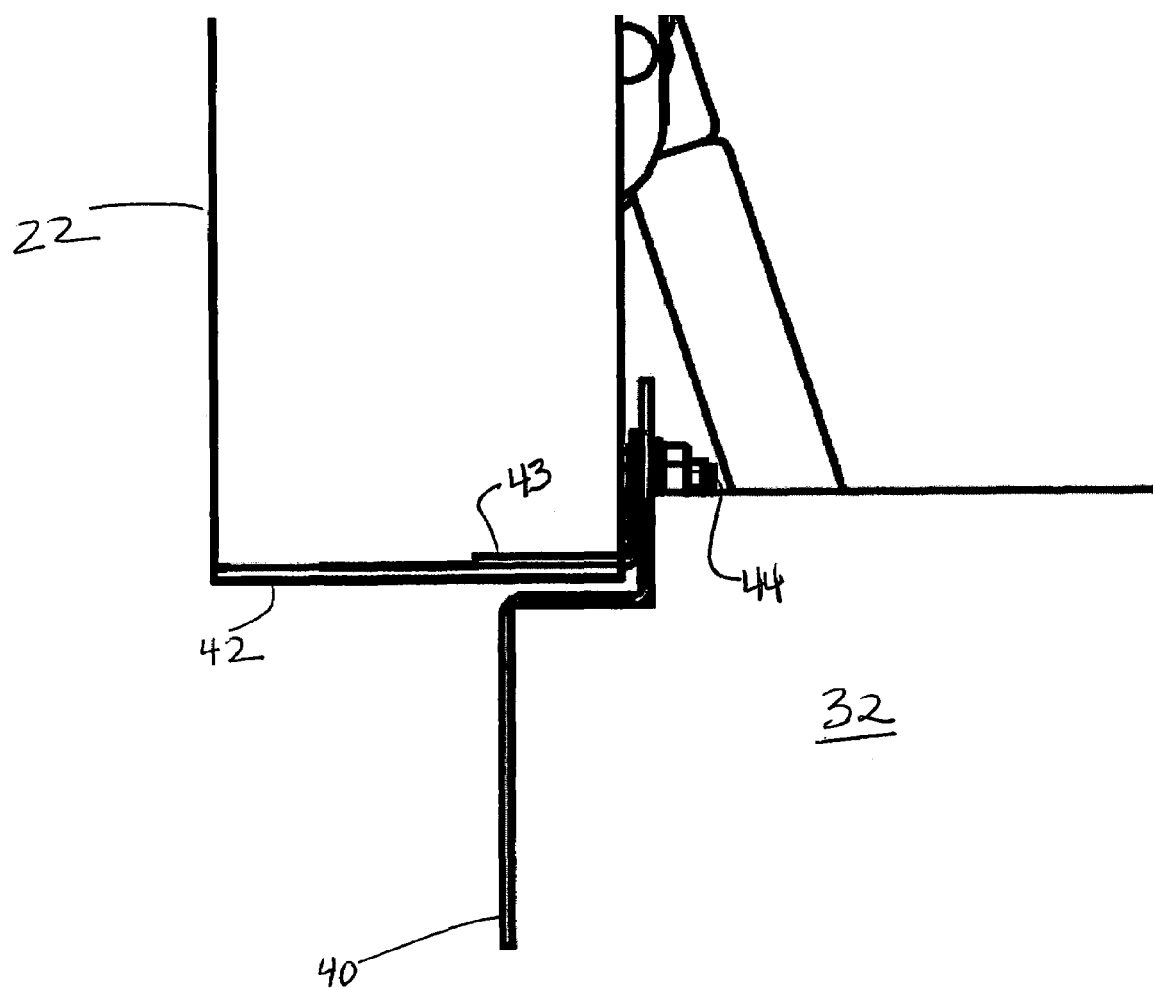
FIG. 3 is a side view of the mounting arrangement of the cover of FIG. 1.

Referring to FIG. 3, a detailed view of the mounting arrangement of the cover on the truck box is shown. The cover 22 is mounted to the back wall 14 via a hinge interface 43 affixed to the back wall 14 of the truck box via fasteners 44. The hinge interface 43 may comprise a continuous piano hinge while the fasteners 44 may take the form of bolts or rivets.

As can be seen from FIGS. 2 and 3, the top cover 22 of the truck box 10 pivots to an open position. The angle $\alpha$ between the interior surface 23 of the cover 22 and the ton surface 35 of the protruding shelf 32, 34 of the storage compartment in the open position is between 85 degrees to 95 degrees, preferably 90 degrees. Such an opening facilitates access to the tools and supplies contained in the truck box. The egress into the box allows for 90 degree opening while minimizing the amount of clearance space required behind the box. Thus, the current invention improves the loss of useable space within the truck bed by reducing the distance the box must be pulled away from the cab wall when opening the cover to 90 degrees.

Now turning to another aspect of the present invention, the truck box 10 is provided with an access for electrical cord passthrough. As can be seen in FIG. 2, the side wall 16 of the chest 10 is provided with a perforated access 50. The exact shape and location of the access 50 can vary. In the preferred embodiment, the shape of the access 50 is a circular hole.

In use, a contractor places a rubber insert or grommet 52 in the access 50, the metal having previously been knocked out at the manufacturing facility. An electrical cord can then be passed through the grommet 52 and connected to a 12 volt power supply. The grommet 52 protects the cord as well as the inside of the truck box 10 from direct weather such as rain or snow.

Figure 4A:
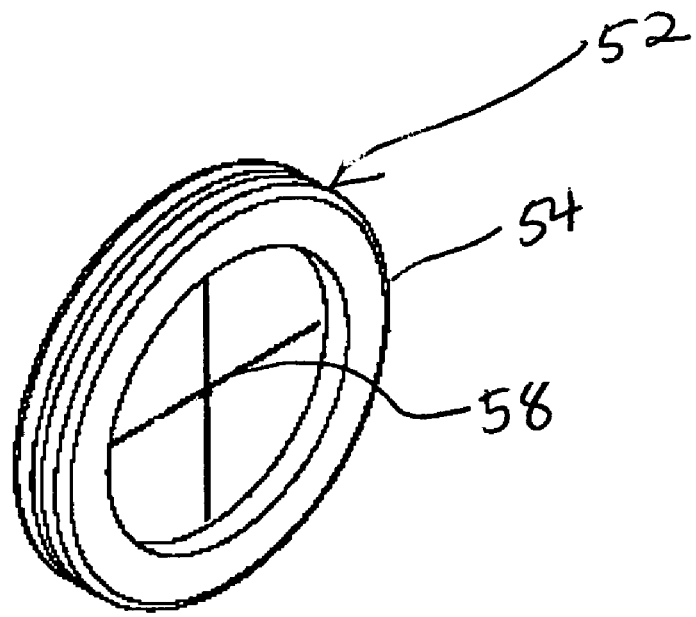
FIGS. 4A-B depict the grommet shown in FIG. 1.
Figure 4B:
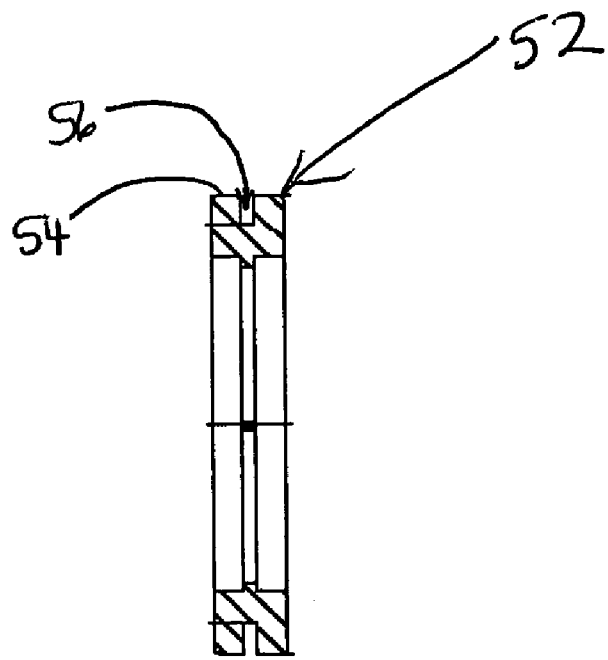

As can be seen from FIGS. 4A-B, the grommet 52 has an outer circumference 54 provided with a groove 56 for mounting to the side wall 16 of the chest 10. The grommet 52 includes a scored surface 58 that enables a cord to be inserted or removed therethough. The grommet 52 may be constructed of rubber.

The electrical cord access 50 of the present invention allows electricity to be provided to equipment stored in the truck box 10. Thus, battery chargers, for example, stored in the box can charge batteries overnight once connected to a power source. Further, the grommet 52 protects the cord as well as the inside of the chest from the elements.

The truck box is constructed of 0.100 and 0.063 smooth and tread plate aluminum. Alternately, different gauges of aluminum or even steel may be used.

While certain features and embodiments of the present invention have been described in detail herein, it is to be understood that the invention encompasses all modifications and enhancements within the scope and spirit of the following claims.

What is claimed is:

1. A storage box for a vehicle having a cargo bed, said storage box comprising:
   a. a storage compartment having a front wall, a back wall, two side walls extending between the front and back walls, and a bottom wall, the back wall including an abutment along a top edge, the abutment having a vertical surface and a horizontal surface, one end of the vertical surface abutting one end of the horizontal surface; and
   b. a top cover mounted to the back wall, the cover being pivotable between a fully open position and a closed position, a portion of the cover being accommodated within the abutment when the cover is in its fully open position, and the cover being located outside of the abutment in the closed position.

2. The storage box of claim 1 wherein each sidewall has a protruding shelf extending therefrom, the protruding shelf including a top surface, and an angle between an interior surface of the cover and the top surface of the protruding shelf of the storage compartment in the fully open position is about 85 to 95 degrees.

3. The storage box of claim 1 wherein the cover is mounted to the back wall via a hinge interface.

4. The storage box of claim 1 further including an access provided on one of the walls for electrical cord passthrough.

5. The storage box of claim 1 wherein the vehicle is a pick-up truck.

6. The storage box of claim 1 wherein the top cover includes a rear wall, a portion of the rear wall of the top cover being accommodated within the abutment when the cover is in its fully open position.

7. A storage box for a vehicle having a cargo bed, said storage box comprising:
   a. a storage compartment having a front wall, a back wall, two side walls extending between the front and back walls, and a bottom wall, the back wall including an abutment along a top edge, the abutment having a vertical surface and a horizontal surface, one end of the vertical surface abutting one end of the horizontal surface;
   b. a top cover mounted to the back wall, the cover being pivotable between a fully open position and a closed position, a portion of the cover being accommodated within the abutment when in its fully open position, and the cover being located outside of the abutment in the closed position; and
   c. an access provided on one of the walls for electrical cord passthrough, thereby providing access to a power supply for equipment contained in the storage box.

8. The storage box of claim 7 wherein the access is a perforated opening.

9. The storage box of claim 8 further comprising a grommet having a scored surface adapted to be inserted into the perforated opening once a disk of material is removed from the opening.

10. The storage box of claim 7 wherein the access is a perforated circular hole.

11. The storage box of claim 7 wherein each sidewall has a protruding shelf extending therefrom, the protruding shelf including a top surface, and an angle between an interior surface of the cover and the top surface of the protruding shelf of the storage compartment in the fully open position is about 85 to 95 degrees.

12. The storage box of claim 7 wherein the cover is mounted to the back wall via a hinge interface.

13. The storage box of claim 2 wherein the angle between the interior surface of the cover and the top surface of the protruding shelf of the storage compartment in the fully open position is 90 degrees.

14. The storage box of claim 11 wherein the angle between the interior surface of the cover and the top surface of the protruding shelf of the storage compartment in the fully open position is 90 degrees.

* * * * *